United States Patent [19]

John et al.

[11] Patent Number: 4,514,099
[45] Date of Patent: Apr. 30, 1985

[54] HYDRODYNAMIC BEARING ASSEMBLY

[75] Inventors: Erich John; Erich Pollak-Banda, both of Augsburg, Fed. Rep. of Germany

[73] Assignee: Zahnraderfabrik Renk AG, Augsburg, Fed. Rep. of Germany

[21] Appl. No.: 522,259

[22] Filed: Aug. 11, 1983

[30] Foreign Application Priority Data

Aug. 21, 1982 [DE] Fed. Rep. of Germany ....... 3231133

[51] Int. Cl.³ .............................................. F16C 17/02
[52] U.S. Cl. .................................... 384/100; 384/114; 384/118
[58] Field of Search ................. 384/99, 100, 107, 111, 384/114, 118, 119, 124, 192, 286, 287, 397, 398

[56] References Cited

U.S. PATENT DOCUMENTS 2,908,164 10/1959 Bamber ........................... 384/114 X
3,659,910 5/1972 Foster ................................ 384/119
3,893,732 7/1975 McCloskey ......................... 308/6 C

FOREIGN PATENT DOCUMENTS 556052 8/1932 Fed. Rep. of Germany.
841534 6/1952 Fed. Rep. of Germany.
2851901 5/1980 Fed. Rep. of Germany.
67443 6/1977 Japan ..................................... 384/398
1213959 11/1970 United Kingdom ................ 384/118

Primary Examiner—John Petrakes
Assistant Examiner—David Werner
Attorney, Agent, or Firm—Larson and Taylor

[57] ABSTRACT

The invention relates to a hydrodynamic bearing assembly in which a relatively broad bearing is divided into two bearings (2, 3) placed axially side by side. Both bearings are connected together to an inner bearing member (1) which is mounted to swivel universally over a spherical sector surface (16) in a cylindrical bore (18) of a surrounding housing. Between the bearing surfaces of both bearings (2, 3) there is provided in the bearing bore (6) a flowing fluid medium passage shared by the bearings, such as an annular groove (10). Through this passage the outlet flow area for the flowing fluid medium is doubled and length of the flow path in the bearing bore (6) reduced by one-half. Concurrently, a more perfect load pressure equalization is achieved on both bearings (2, 3) owing to the ball-joint-type universal bearing arrangement between the inner bearing member (1) and the housing (20).

8 Claims, 3 Drawing Figures

HYDRODYNAMIC BEARING ASSEMBLY

This invention relates to a hydrodynamic bearing assembly of the type wherein a shaft mounted by the assembly exerts a load thereon.

Bearings can be loaded only to a limited extent and operated at a limited rotational speed. Both factors, i.e., the magnitude of the load on the bearing and the rotational speed, determine essentially the power loss produced in the bearing in the form of heat, which power loss must be removed by means of a fluid medium, normally oil which is used for cooling and lubricating the bearing. Flow of the fluid medium, and hence also heat dissipation, are strongly influenced by the ratio of bearing width to bearing diameter. For a specified bearing load, the power loss can be reduced by lowering the bearing speed, i.e. the speed of the shaft mounted in or supported by the bearing. For a constant load, however, this requires an increase in the width-to-diameter ratio of the bearing. However, with such an increasing bearing width, the dissipation of heat from the bearings becomes increasingly difficult, and the temperatures in the area of the highest bearing pressure can rise to unacceptably high values. The broader the bearing, the more difficult it becomes to obtain a uniform load distribution over the entire width of the bearing.

It is a purpose of the present invention to provide a bearing assembly which can support heavier loads while avoiding unduly high temperatures by improving heat dissipation and uniformly distibuting the load within the bearing assembly.

This purpose of the present invention is solved by providing, in accordance with preferred embodiments of the present invention, a hydrodynamic bearing assembly of the type described which includes a pair of hydrodynamic bearing races arranged side by side on the shaft, spaced apart by an annular groove through which fluid flows for cooling purposes and connected together to form an inner bearing member. This inner bearing member engages a surrounding housing via a universal means which permits limited universal swivelling movement of the inner bearing member within the housing. Fluid discharging from the two hydrodynamic bearing races flows in both directions, i.e. outwardly to the axial exterior of the bearing assembly and inwardly toward the annular groove.

In accordance with specific features of the present invention, the universal means may comprise a sector of a spherical surface formed on the inner bearing member and engaging the housing; and the internal surface of the surrounding housing may be cylindrical. Various arrangements may be provided for introducing the cooling fluid, preferably a lubricating oil through the housing and/or inner bearing member to the pockets of the hydrodynamic bearing assembly and for discharging the fluid from the annular groove. For example, the pressurized fluid introduced into the hydrodynamic bearing assembly may pass through two separate passageways in the housing, each leading to a different passageway within the inner bearing member or a single passageway may be provided in the housing, which connects within the inner bearing member to two separate passages leading to the hydrodynamic fluid pockets. Fluid from the annular groove may be discharged in either an axial or a generally radial direction.

With the present invention, the load exerted by the shaft on the bearings, which would previously have been absorbed by a relatively broad bearing, is divided over two bearings which are functionally independent of one another but which are operatively connected together for swivelling movement about a center point lying on the shaft axis and located mid-way between the radial central planes of the two bearings. This will insure a more perfect load equalization among the two bearings. Concurrently, by means of a fluid medium piping and an annular groove formed in the bearing assembly facing the shaft and symmetrically, mid-way between the two bearings, half of the fluid medium discharging from the two bearings will flow toward the said annular groove while the other half of the fluid medium will be discharged axially, outwardly toward the outer end faces of the bearing assembly. In this manner, according to the present invention, the flow area for the discharging fluid is twice as large and the length of the fluid flow path is half as large when compared to a single bearing assembly having a width in the axial direction which is the same as the width of the overall bearing assembly of the present invention, and of course in the case of the prior bearing assembly, the fluid discharge is only in the direction toward the outer end faces of the bearing assembly.

Hence, it is an object of the present invention to provide a new and improved hydrodynamic bearing assembly. This and other objects of the present invention will become apparent from the detailed description to follow, taken together with the accompanying drawings, wherein.

Referring now to the drawings, like elements are represented by like numerals throughout the several views.

Figure 1:
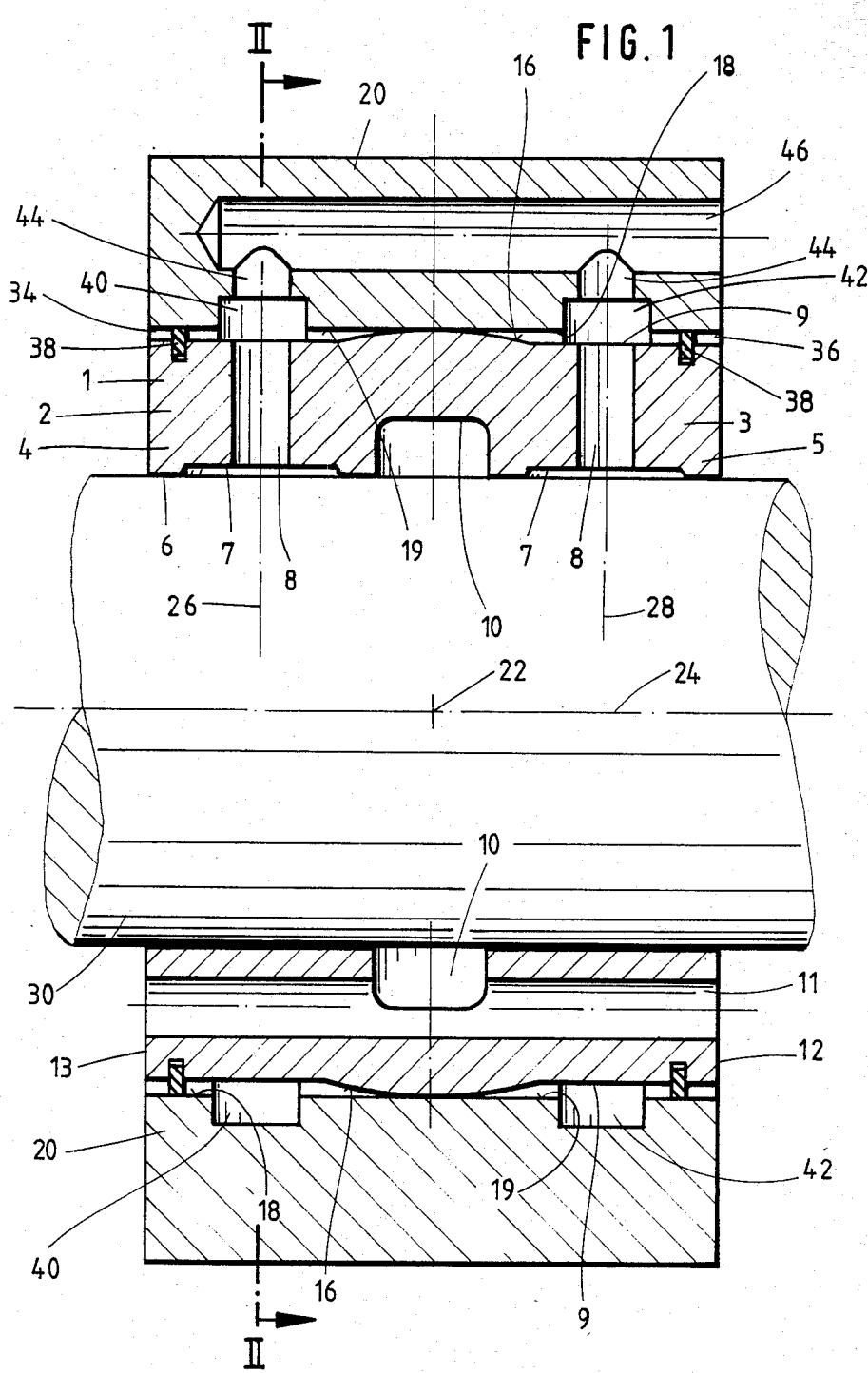
FIG. 1 is a longitudinal cross-sectional view of a hydrodynamic bearing assembly in accordance with the present invention and taken along line I—I of FIG. 2.

The hydrodynamic bearing assembly according to the invention comprises a single-piece inner bearing member 1 which comprises two hydrodynamic radial bearings 2 and 3 arranged axially side by side and having inner bearing races 4 and 5, respectively. In the bearing bore 6 of the inner bearing member 1 there are provided hydrodynamic bearing pockets 7 which are connected over radial bores 8 to the outer circumferences 9 of the bearing member 1. In the bearing bore 6 there is provided between the two radial bearings 2 and 3 an annular groove 10 which is connected over at least one axially extending bore 11 in the bearing member 1 to the outer end faces 12 and 13 of the bearing assembly.

The bearing member 1 is interconnected to its surrounding housing 20 by a universal means. For example, in the illustrated preferred embodiments, the outer circumference 9 of the inner bearing member 1 is provided with a spherical sector surface 16 which is supported in and operatively engages a cylindrical axial bore 18 of the housing 20 surrounding the bearing member 1. The curvature midpoint 22 of the spherical sector surface 16 lies on the bearing axis 24 midway between the two bearing central planes 26 and 28. The spherical sector surface 16 is in conforming engagement with a cylindrical bore section 19 of the housing bore 18 so that the bearing liner 1 can follow decalage movements of a supported shaft 30 in any direction, with the result that, regardless of the magnitude of the bearing load and the resulting shaft deformation, both bearings 2 and 3 and, thereby, the whole bearing assembly, are loaded uniformly, thereby avoiding localized peak loads.

Axially to both sides of the spherical sector surface 16 there are provided between the bearing member 1 and the housing 20 annular gaps 34 and 36, the radial size of which is so selected that the bearing member 1 can execute swivelling motions about the center of sphere 22. In the annular gaps 34 and 36 piston ring type seals 38 are provided which prevent the flowing fluid medium from being discharged axially outwardly from the annular gaps 34 and 36. There are formed between the piston ring seals 38 and the spherical sector surface 16 or between the bearing member 1 and the housing 20 annular spaces 40 and 42 into which lead radial bores 44 of the housing 20 which are connected to a longitudinal bore 46 extending parallel to the bearing axis 24. The bores 44, 46 and 8 form together with the annular spaces 40 and 42 a supply line for a flowing fluid medium, normally oil, to the bearing pockets 7 of the bearings 2 and 3. The annular groove 10 provided in the bearing member 1 and the bore 11 form a passage for the discharge of approximately half of the flowing fluid medium from the bearing bore 6, while the other half of the flowing fluid medium flows outwardly in opposite directions to the bearing end faces 12 and 13, substantially in the axial direction between the bearing bore and the supported shaft 30. This reduces to approximately one-half the flow path in comparison with a bearing having the axial width of both bearings 2 and 3. In this way, the time during which each portion of the fluid remains in the bearing assembly is shorter and, hence, there is less heating.

In an alternative to this embodiment described above, the two bearings 2 and 3 can be designed differently, for example, they can have different widths. Further, the bearing member 1 may comprise several parts which are rigidly connected together.

Figure 2:
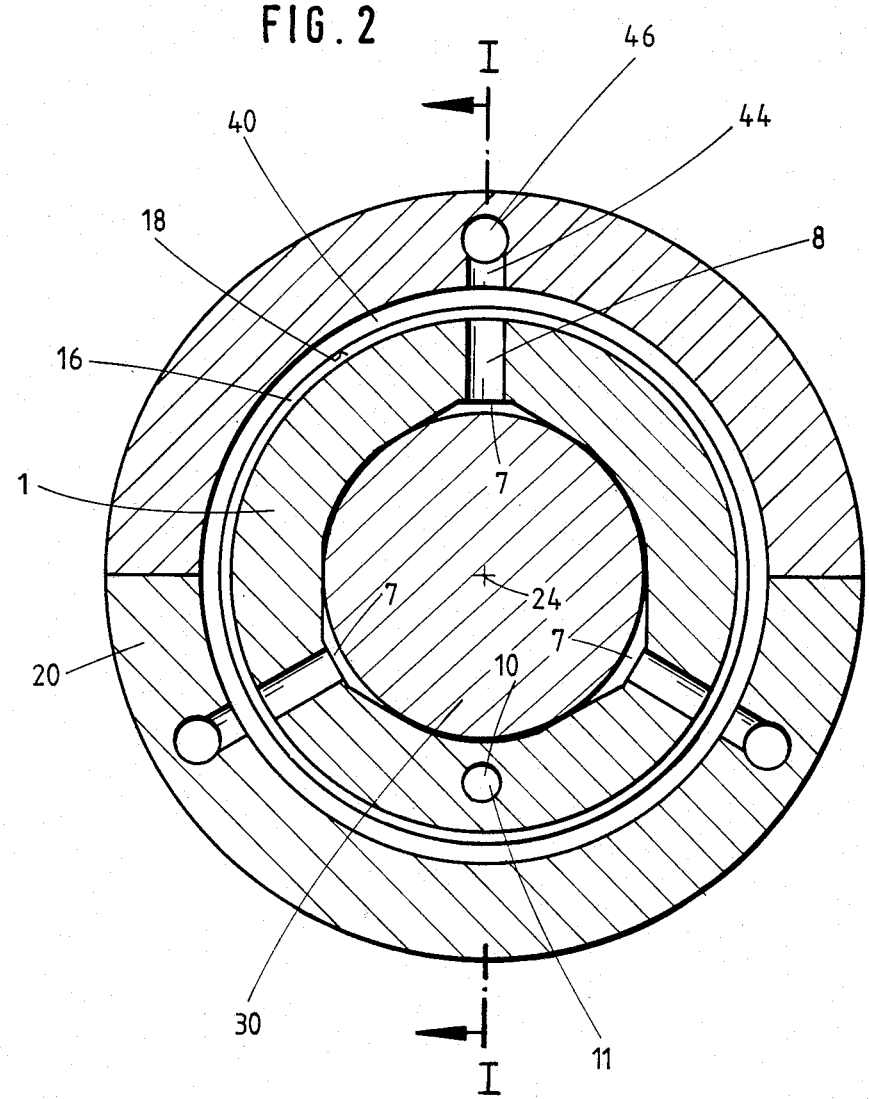
FIG. 2 is a cross-sectional view taken along line II—II of FIG. 1.
Figure 3:
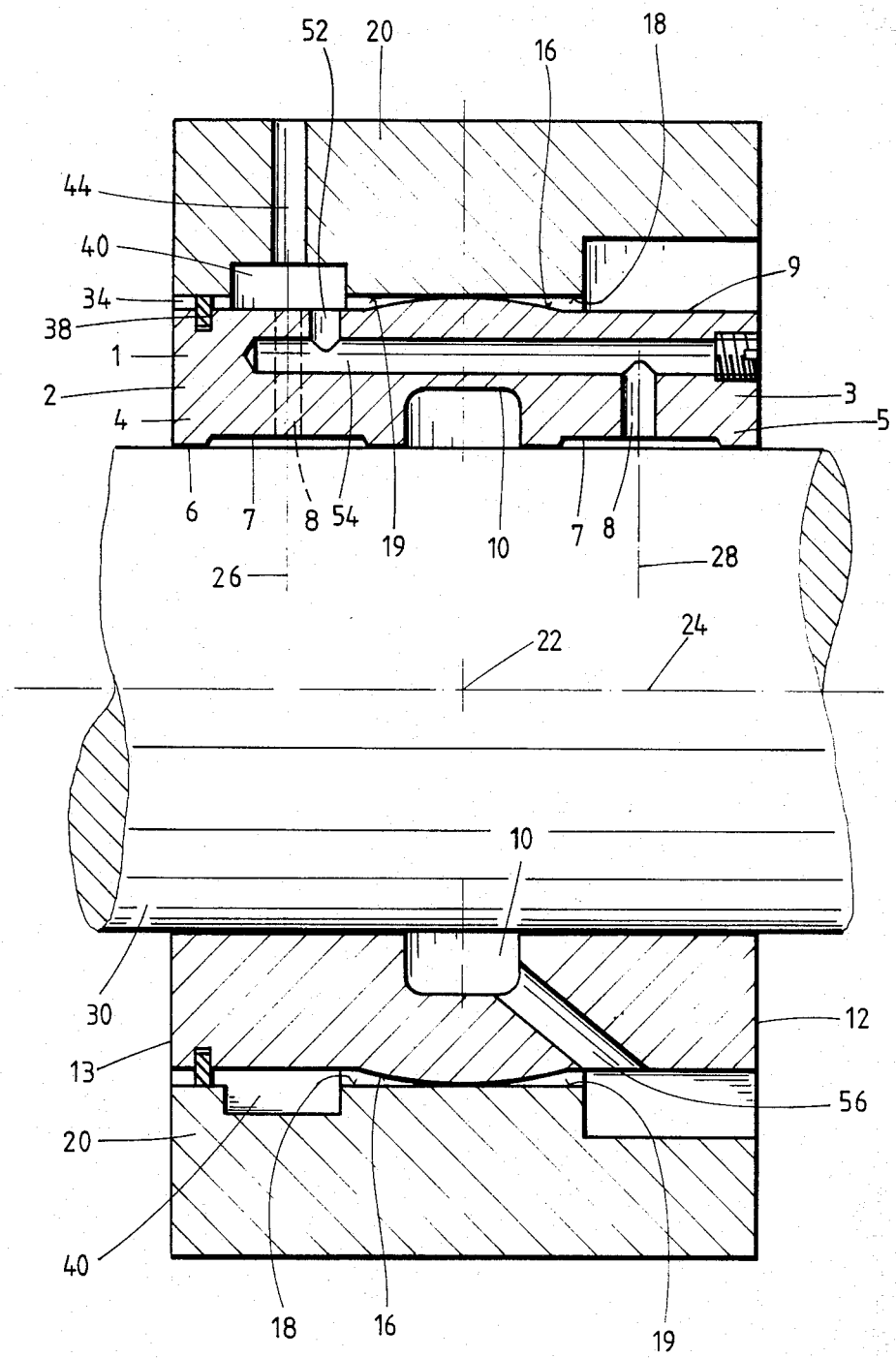
FIG. 3 is a longitudinal cross-sectional view similar to FIG. 1 but showing another embodiment of the present invention.

According to another embodiment, shown in FIG. 3, it may prove useful if the supply of flowing fluid medium for both bearings occurs on one side, for example, on one bearing 2 through a radial bore 44 in housing 20 to the annular space 40 and from there, via at least one radial bore 52, and axially extending bore 54 of the inner bearing member 1 as well as radial bore 8, to the bearing pocket 7 of the other bearing 4, while on the diametrically opposed circumferential side at least one passage 56 leads from the annular groove 10 over a short path to the outer circumference 9 of the bearing member 1. In this way, the flowing fluid medium is prevented from additionally heating the bearing parts. In FIG. 3, the parts corresponding to FIGS. 1 and 2 are provided with the same reference numerals as in FIGS. 1 and 2.

Although the invention has been described in considerable detail with respect to preferred embodiments thereof, it will be apparent that the invention is capable of numerous modifications and variations, apparent to those skilled in the art, without departing from the spirit and scope of the invention.

We claim:

1. A hydrodynamic bearing assembly of the type wherein a shaft mounted therein exerts a load thereon, comprising:
   a pair of hydrodynamic bearing races arranged side by side on the shaft and spaced apart from each other by an annular groove located therebetween said two bearing races being connected together to form an inner bearing member,
   a housing located radially outwardly from said inner bearing member,
   universal means interconnecting the inner bearing member with said housing for permitting limited universal swivelling movement of the inner bearing member within the housing, about a center point lying on the shaft axis and midway between the radial central planes of the two bearing races,
   said annular groove opening onto the shaft, such that a portion of the fluid discharging from the two hydrodynamic bearing races flows along the interior of the inner bearing member to the annular groove, from which it is discharged, while another portion of said fluid flows oppositely, in a direction opposite from the annular groove, to the axial exterior of the inner bearing member,
   at least one fluid passageway through the housing and through the inner bearing member, opening at the inner surface of the bearing races into fluid pockets located thereat,
   said fluid passageway including an enlarged annular space formed between the radial inner surface of said housing and the adjacent outer surface of the inner bearing member.

2. A hydrodynamic bearing assembly according to claim 1, wherein said universal means comprises a sector of a spherical surface formed on the inner bearing member and engaging and supported by an internal surface on the surrounding housing.

3. A hydrodynamic bearing assembly according to claim 2, wherein the internal surface of the surrounding housing is cylindrical where it is engaged by said spherical sector.

4. A hydrodynamic bearing assembly according to claim 1, said annular groove being located symmetrically midway between the two bearing races.

5. A hydrodynamic bearing assembly according to claim 4, including a bore formed in the inner bearing member extending substantially parallel to the bearing axis and in communication with the annular groove to receive fluid discharged therefrom.

6. A hydrodynamic bearing assembly according to claim 1, including a pair of said fluid passageways through the housing and through the inner bearing member.

7. A hydrodynamic bearing assembly according to claim 1, including a single fluid passageway through the housing and communicating with the inner bearing member, and including a passageway within the inner bearing member connecting the first said passageway with said fluid pockets.

8. A hydrodynamic bearing assembly according to claim 1, including a radial clearance between the inner bearing member and the housing to allow said limited universal swivelling movement.

* * * * *